United States Patent [19]

Amini et al.

[11] Patent Number: 5,544,346

[45] Date of Patent: Aug. 6, 1996

[54] SYSTEM HAVING A BUS INTERFACE UNIT FOR OVERRIDING A NORMAL ARBITRATION SCHEME AFTER A SYSTEM RESOURCE DEVICE HAS ALREADY GAINED CONTROL OF A BUS

[75] Inventors: Nader Amini; Bechara F. Boury; Sherwood Brannon, all of Boca Raton; Richard L. Horne, Boynton Beach; Terence J. Lohman, Boca Raton, all of Fla.

[73] Assignee: International Business Machines Corporation, Armonk, N.Y.

[21] Appl. No.: 353,165

[22] Filed: Dec. 9, 1994

Related U.S. Application Data

[63] Continuation of Ser. No. 815,992, Jan. 2, 1992, abandoned.

[51] Int. Cl.[6] .......................... G06F 13/00; G06F 13/36; G06F 13/40
[52] U.S. Cl. .......................... 395/481; 395/288; 395/296; 395/303; 395/485; 395/728; 395/848; 395/860; 364/242.8; 364/242.92; 364/935.41; 364/937.01; 364/DIG. 1
[58] Field of Search .................... 395/425, 325, 395/725, 481, 484, 485, 492, 494, 495, 496, 728, 729, 730, 731, 732, 842, 848, 856, 860, 287, 288, 296, 303, 726, 297

[56] References Cited

U.S. PATENT DOCUMENTS

| | | | |
|---|---|---|---|
| 4,442,502 | 4/1984 | Friend et al. | 395/311 |
| 4,785,394 | 11/1988 | Fischer | 395/294 |
| 4,788,640 | 11/1988 | Hansen | 395/478 |
| 4,947,368 | 8/1990 | Donaldson et al. | 395/297 |
| 4,967,344 | 10/1990 | Scavezze et al. | 395/182.02 |
| 4,980,854 | 12/1990 | Donaldson et al. | 395/297 |
| 4,982,321 | 1/1991 | Pantry et al. | 395/287 |
| 5,003,463 | 3/1991 | Coyle et al. | 395/877 |
| 5,239,631 | 8/1993 | Boury et al. | 395/297 |

FOREIGN PATENT DOCUMENTS

| | | |
|---|---|---|
| 0141302 | 5/1985 | European Pat. Off. . |
| 0288649 | 11/1988 | European Pat. Off. . |
| 0311704 | 4/1989 | European Pat. Off. . |

Primary Examiner—Glenn Gossage
Attorney, Agent, or Firm—Daniel E. McConnell

[57] ABSTRACT

An information handling systems capable of transferring data among various system resource devices such as input/output (I/O) devices and a system memory includes a first bus coupled to the system memory, a second bus coupled to the system resource devices, and a bus interface unit (BIU) coupled between the first bus and the second bus. Each of the system resource devices is capable of controlling the second bus after arbitrating therefor. The BIU includes a buffer for temporary storage of data being transferred between the first bus and the second bus, and control logic for generating a lock control signal, after one of the system resource devices has gained control of the second bus by arbitration, to gain control of the first bus to prevent other system resource devices from accessing the first bus. The control signal is dynamically generated by the BIU based on programmable conditions relating to the data transfer, thus optimizing data transfers between the first bus and the second bus. The control signal may act as an override to the normal memory controller arbitration scheme to prioritize access of the system resource devices to the system memory.

11 Claims, 7 Drawing Sheets

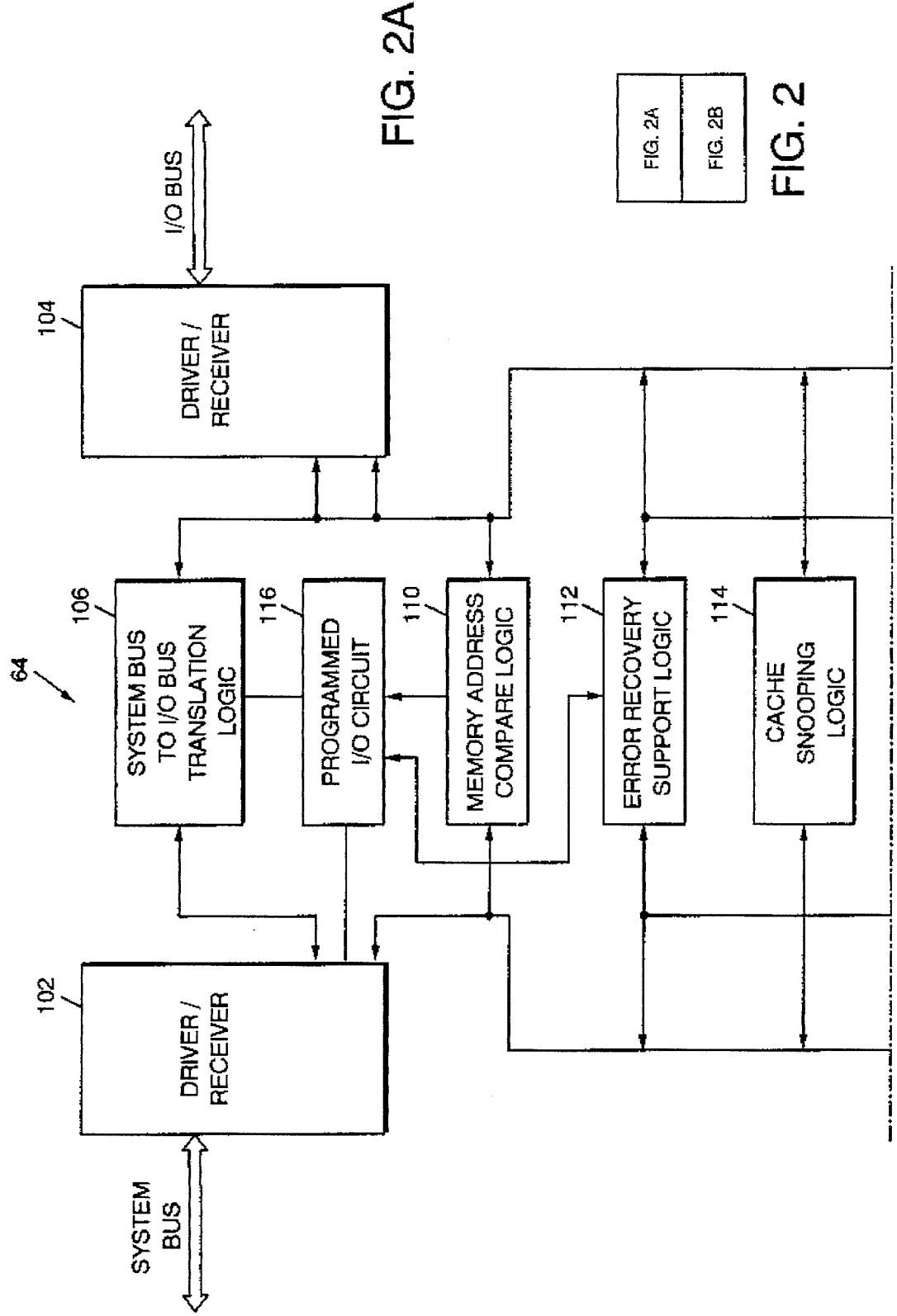

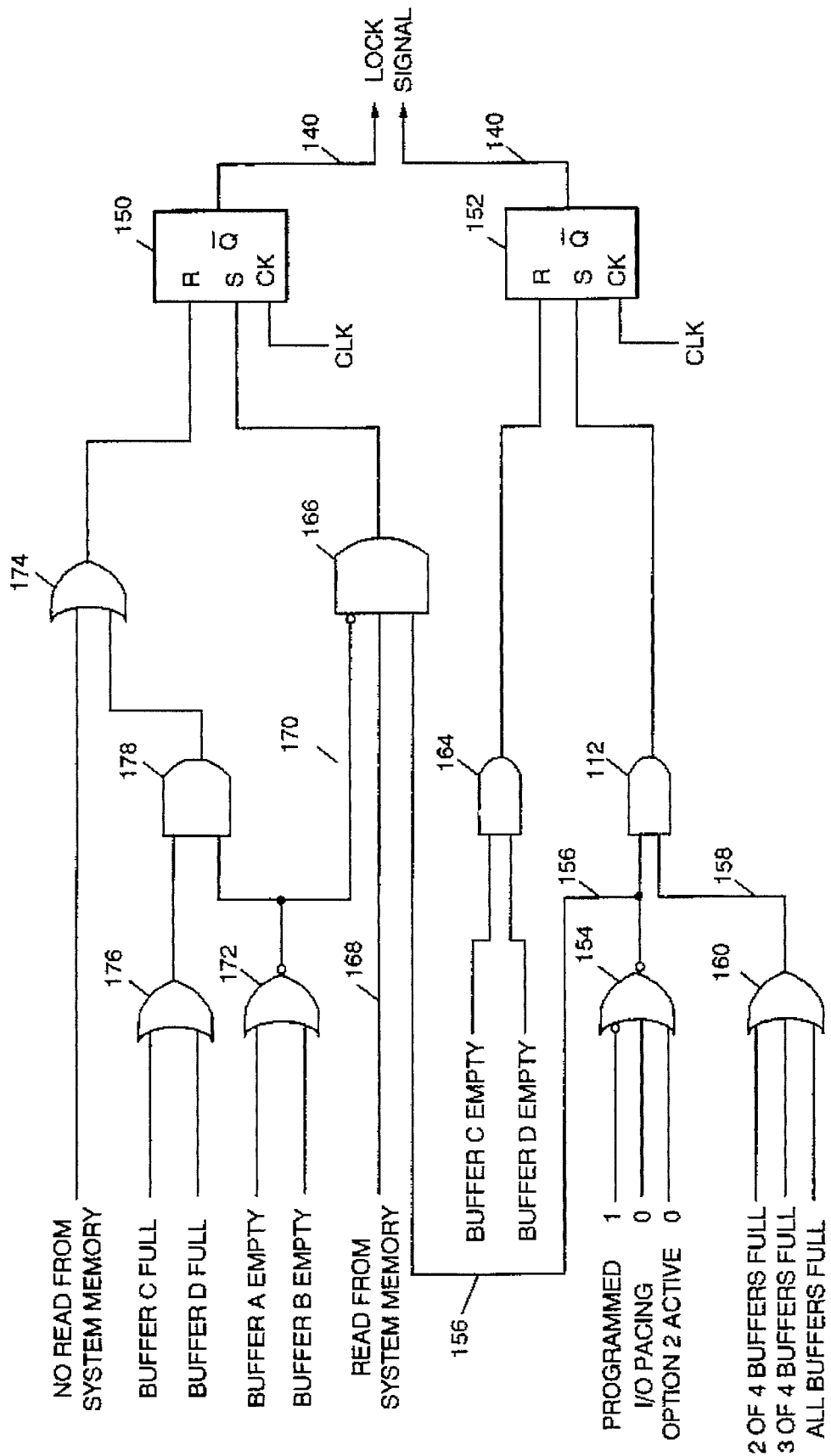

SYSTEM HAVING A BUS INTERFACE UNIT FOR OVERRIDING A NORMAL ARBITRATION SCHEME AFTER A SYSTEM RESOURCE DEVICE HAS ALREADY GAINED CONTROL OF A BUS

This application is a continuation of application Ser. No. 07/815,992, filed Jan. 2, 1992, now abandoned.

RELATED APPLICATIONS

The following United States patent applications are incorporated herein by reference as if they had been fully set out:

Application Ser. No. 07/816,116 Filed Jan. 2, 1992 Entitled "ARBITRATION MECHANISM", now U.S. Pat. No. 5,265,211.

Application Ser. No. 07/816,184 Filed Jan. 2, 1992 Entitled "PARITY ERROR DETECTION AND RECOVERY", now U.S. Pat. No. 5,313,627.

Application Ser. No. 07/816,204 Filed Jan. 2, 1992 Entitled "CACHE SNOOPING AND DATA INVALIDATION TECHNIQUE", now abandoned in favor of continuation application Ser. No. 08/327,136.

Application Ser. No. 07/816,203 Filed Jan. 2, 1992 Entitled "BUS INTERFACE LOGIC FOR COMPUTER SYSTEM HAVING DUAL BUS ARCHITECTURE", now U.S. Pat. No. 5,255,374.

Application Ser. No. 07,816,691 Filed Jan. 2, 1992 Entitled "BIDIRECTIONAL DATA STORAGE FACILITY FOR BUS INTERFACE UNIT", now abandoned in favor of continuation application Ser. No. 08/282,159.

Application Ser. No. 07/816,693 Filed Jan. 2, 1992 Entitled "BUS INTERFACE FOR CONTROLLING SPEED OF BUS OPERATION", now abandoned in favor of continuation application Ser. No. 08/293,411.

Application Serial No. 07/816,698 Filed Jan. 2, 1992 Entitled, now abandoned in favor of continuation application Ser. No. 08/298,538.

BACKGROUND OF THE INVENTION

The present invention relates to bus to bus interfaces in dual bus architecture computer systems, and more particularly to a bus to bus interface device and method for arbitrating between a central processing unit and an input/output device each of which is vying for access to system memory.

Generally in computer systems and especially in personal computer systems, data is transferred between various system devices such as a central processing unit (CPU), memory devices, and direct memory access (DMA) controllers. In addition, data is transferred between expansion elements or "system resources devices" such as input/output (I/O) devices, and between these I/O devices and the various system devices. The I/O devices and the system devices communicate with and amongst each other over computer buses, which comprise a series of conductors along which information is transmitted from any of several sources to any of several destinations. Many of the system devices and the I/O devices are capable of serving as bus controllers (i.e., devices which can control the computer system) and bus slaves (i.e., elements which are controlled by bus controllers).

Personal computer systems having more than one bus are known. Typically, a local bus is provided over which the CPU communicates with cache memory or a memory controller, and a system I/O bus is provided over which system bus devices such as the DMA controller, or the I/O devices, communicate with the system memory via the memory controller. The system I/O bus comprises a system bus and an I/O bus connected by a bus interface unit. The I/O devices communicate with one another over the I/O bus. The I/O devices are also typically required to communicate with system bus devices such as system memory. Such communications must travel over both the I/O bus and the system bus through the bus interface unit.

The local bus devices such as the CPU and the system I/O bus devices in dual bus architecture computer systems compete for access to system memory via the memory controller. The system bus devices and the I/O devices access the memory controller via the system bus. The CPU accesses the memory controller through the local bus. Prior to accessing system memory via the memory bus, then, these competing devices must first gain control of the memory controller. Often, in high speed data transfers, a system I/O bus device and a local bus device may simultaneously desire control of the memory bus controller. High speed I/O devices and microprocessors place high demand on system memory, creating contention between each other and thereby reducing system performance. Thus, the computer system must provide a scheme of arbitration to determine whether the local bus device or the system I/O bus device should have access to system memory.

A typical arbitration scheme includes an arbiter which grants control of the system bus on a first come, first served basis. Thus, if both a I/O bus device and a local bus device desire access to system memory, the first device to transmit the control request is granted control of the memory controller. After the particular device which is acting as memory bus controller is finished either reading or writing a data sequence to system memory over the memory bus, the waiting device is then granted control of the memory controller. This process continues indefinitely as long as a local bus devices, such as the CPU, and a system I/O device have pending requests for control of the memory controller.

Various I/O device bus controllers manage reads and writes to system memory at different speeds. Some high speed I/O devices are capable of transmitting data over the I/O bus to the bus interface unit as fast as the bus interface unit can retransmit that data over the system bus. Often these high speed devices transmit the data in a series of data sequences, or packets, which have contiguous addresses in system memory. Under the typical arbitration scheme described above, if a local bus device has a pending request for control of the system bus during one of these multiple packet transmissions, the arbiter will grant control of the memory bus to the local device as soon as the first packet has been transmitted by the I/O device. After the local bus device has finished its operation, control of the memory bus is once again granted to the I/O device.

This type of system operation is inefficient because, typically, a local bus device such as a CPU and an I/O device work in different areas of system memory. Thus, in granting control of the memory bus back and forth between the CPU and the I/O device, typically, with each successive operation, the memory addresses are to different pages of memory, requiring a longer memory access time. If, as explained above, the I/O device is reading or writing to system memory a large block of data having contiguous addresses in that memory, it is beneficial to allow the I/O device to complete its multiple packet transfer of data before releasing control of the memory bus to the CPU.

In this manner, the memory controller is able to read or write multiple packet transfers to system memory at contiguous locations (i.e., on the same "page" of information) before access to memory is granted to the CPU. The time required for the second and subsequent data transfers between system memory and the I/O device is minimized because memory accesses are optimized when addressed to the same page of system memory. Upon completion of the last data transfer between system memory and the I/O device, the CPU may then be granted control of the memory bus in order to complete its read or write operation. Overall, such system operation results in a data transfer time saving.

It is an object of the present invention, then, to provide a bus interface unit in a dual bus architecture computer system which provides the arbitration logic required to optimize control of the memory bus between an I/O device residing on the I/O bus and a local device residing on the local bus.

SUMMARY OF THE INVENTION

Briefly according to the invention, an information handling system capable of transferring data among various system resource devices such as I/O devices and a memory is provided which includes a first bus, a second bus and a bus interface unit coupled between the first bus and the second bus. The first bus is coupled to the system memory for transferring data with the system resource devices. At least one of the system resource devices is coupled to and is capable of controlling the second bus after arbitrating therefor. The bus interface unit includes a buffer for temporary storage of the data being transferred between the first bus and the second bus and it also includes control logic for dynamically generating a control signal to gain control of the first bus to prevent other of the system resource devices coupled to the first bus from accessing the first bus. The control logic is dynamically responsive to signals indicative of data transfer conditions between the first bus and the second bus to generate the control signal.

The conditions under which I/O device is granted priority access to system memory are as follows: (1) a read request by an I/O device controlling the I/O bus is not aligned with a predefined 16-byte address boundary in system memory, (2) an I/O device controlling the I/O bus immediately follows a write cycle with a read cycle, (3) an I/O device controlling the I/O bus completes a data transfer cycle, (4) an I/O device controlling the I/O bus is reading or writing data in streaming mode, or (5) more than half of the buffer space in the bus interface unit is already filled with data to be written to system memory or less than half of the buffer space is yet to be filled with prefetched data to be read from system memory. Streaming refers to data transfers of a stream of data having contiguous addresses wherein only the first address needs to be decoded and the subsequent addresses are considered to be contiguous.

In the preferred embodiment of the present invention, the bus to bus control logic operates under three pacing modes by which the data transfer speeds of I/O devices are optimally matched to the data transfer capability of the system memory. The first of these pacing modes is the default pacing mode, which determines the pacing for the first three conditions listed above. The second of these pacing modes (option 1) determines the pacing for the fourth listed condition, and the third of these pacing modes (option 2) determines the pacing for the fifth listed condition. A user of the system may choose either pacing mode (option 1 or option 2) in addition to the default pacing mode which the system automatically provides. The choice is made by programming the contents of a programmable register in the bus interface unit.

Under the first of the default conditions, an I/O device requests a read of system memory which is not aligned with a particular 16-byte packet boundary. To compensate for this misalignment, access by the I/O device to system memory is locked until enough data is automatically prefetched to arrive at a 16-byte boundary. This read data of less than 16-bytes is then synchronized to the timing of the I/O bus, and the I/O device controller begins to read the data. The bus interface unit then prefetches the next contiguous 16-byte packet. Because this 16-byte packet begins at a predefined boundary, a 16-byte burst transfer is possible.

Under the second condition, residual buffered write data may exist in the bus interface unit buffer space when the I/O device changes from a write transfer to a read request. Once the I/O device bus controller changes from a write to a read, bus control logic determines that an end of cycle has occurred, that there is no more write data to be stored in the buffer space, and that read data is now being requested from system memory. Because it is known that no more contiguous write data is immediately forthcoming, the buffered data is written to system memory and the read data is prefetched from system memory in one atomic operation.

Under the third condition, residual buffered data may also exist in the bus interface unit buffer space when the I/O controller device relinquishes control of the I/O bus after a data transfer cycle. In this instance, such residual data is automatically written to system memory. If more than half of the buffer space includes such residual data, as soon as the I/O device controller relinquishes control of the I/O bus, the bus control logic will generate a signal to the memory controller to indicate that data in the buffer exceeding one transfer in length (i.e., greater than 16 bytes) needs to be written to system memory. Accordingly, the buffered data will be provided access to system memory via the system bus.

The bus control logic for implementing option 1 (relating to the fourth condition described above) comprises a clocked set-reset (S-R) latch which provides a control signal Lock to the memory controller. The LOCK signal provides an I/O device in control of the I/O bus continued access to system memory when the I/O device is reading or writing data to system memory in streaming mode. Upon detection of a streaming data write operation, when one of the bus interface unit buffers is full of buffered write data, a locked burst write sequence is initiated to system memory over the system bus and will remain active until the I/O device terminates the streaming sequence or until there is no data remaining in the buffer space. Similarly, upon detection of a streaming data read operation, a locked burst read sequence is initiated to system memory and will remain active as long as there is room in the buffer space or until the I/O device terminates the streaming sequence.

The bus control logic for implementing option 2 (relating to the fifth condition described above) comprises separate logic circuits each associated with a latch for outputting the LOCK signal to the memory controller. The LOCK signal provides an I/O device in control of the I/O bus continued access to system memory when more than half of the bus interface unit buffer space is already filled with data to be written to system memory or less than half of the buffer space is yet to be filled with prefetched data to be read from system memory.

BRIEF DESCRIPTION OF THE DRAWINGS

FIG. 5 is a circuit diagram of the control logic used to implement another embodiment of the bus to bus pacing logic of FIG. 3.

DETAILED DESCRIPTION OF THE PREFERRED EMBODIMENT

Figure 1:
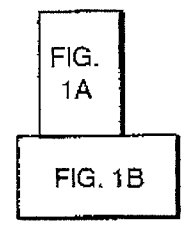
FIG. 1 is a schematic block diagram of a computer system incorporating a bus interface unit constructed according to the principles of the present invention.
Figure 1A:
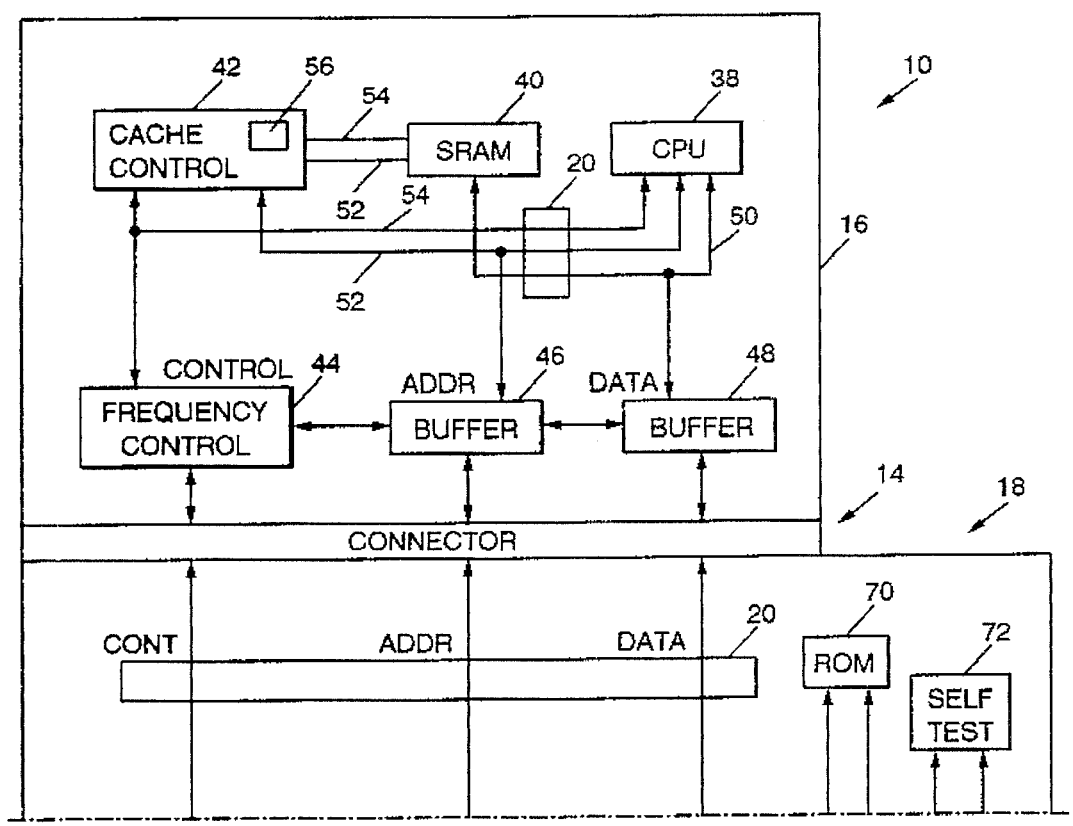
Figure 1B:
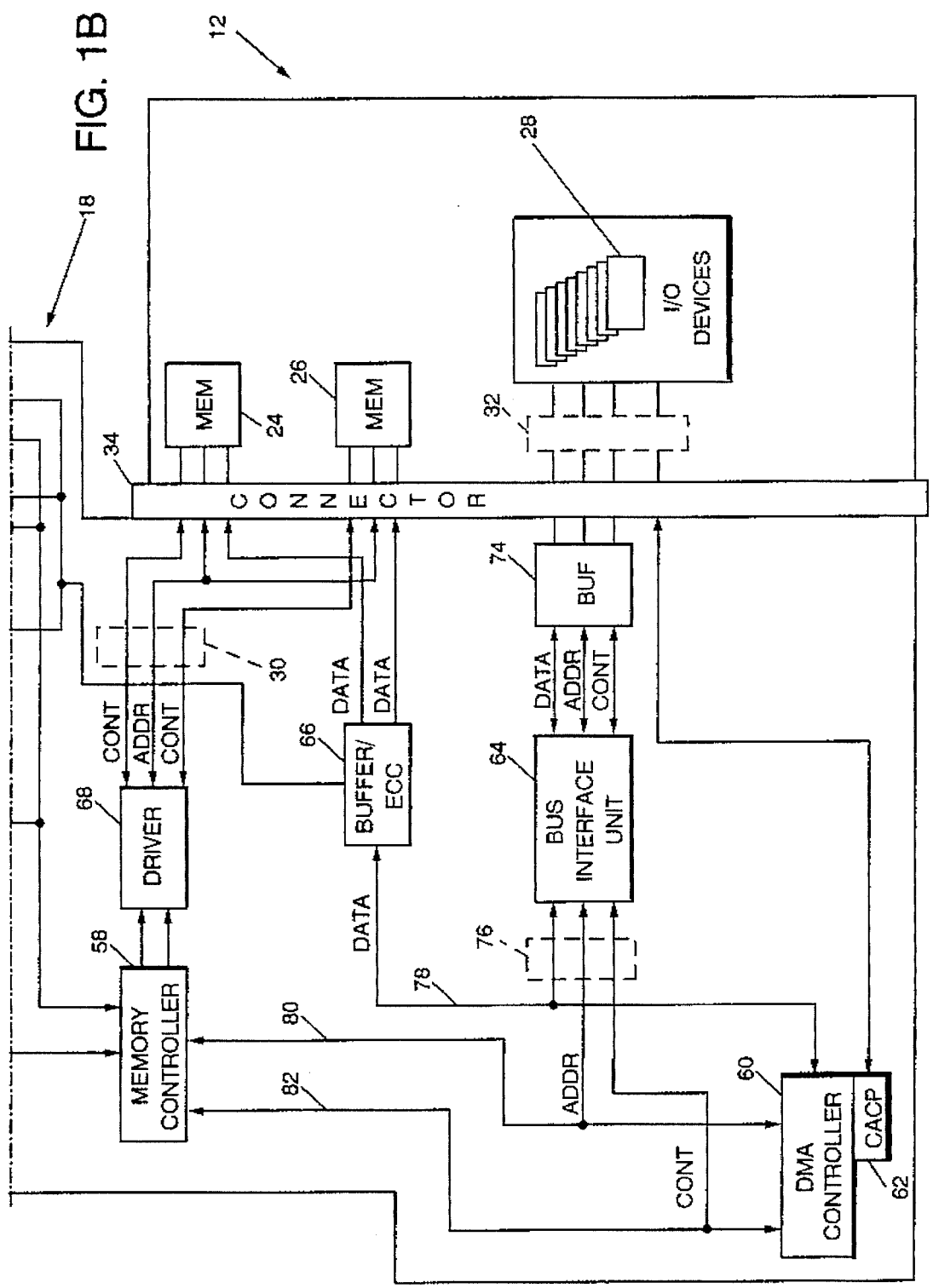

Referring first to FIG. 1, a computer system shown generally at 10 comprises system board 12 and processor complex 14. Processor complex includes processor portion 16 and base portion 18 connected via local bus connector 22. Processor portion 16 operates at 50 MHz and base portion 18 operates at 40 MHz.

System board 12 includes interleaved system memories 24 and 26 and input/output (I/O) devices 28. Communications between memories 24 and 26 and processor complex 14 are handled by memory bus 30, and communications between I/O devices 28 and processor complex 14 are carried by I/O bus 32. Communications between I/O devices and memories 24 and 26 are handled by I/O bus 32, system bus 76 and memory bus 30. I/O bus 32 may conform to MICRO CHANNEL® (trademark of International Business Machines (IBM), Armonk, N.Y.) computer architecture. Memory bus 30 and I/O bus 32 are connected to processor complex base portion 18 via processor complex connector 34. I/O devices such as memory expansion devices may be connected to the computer system 10 via I/O bus 32. System board 12 may also include conventional video circuitry, timing circuitry, keyboard control circuitry and interrupt circuitry (none of which are shown) which may be used by computer system 10 during normal operation.

Processor portion 16 of processor complex 14 includes central processing unit (CPU) 38 which, in the preferred embodiment, is a 32-bit microprocessor available from Intel Corp., Santa Clara, Calif., under the trade designation i486. Processor portion 16 also includes static random access memory (SRAM) 40, cache control module 42, frequency control module 44, address buffer 46 and data buffer 48. Local bus 20 comprises data information path 50, address information path 52 and control information path 54. Data information path 50 is provided between CPU 38, SRAM 40 and data buffer 48. Address information path 52 is provided between CPU 38, cache control module 42 and address buffer 46. Control information path 54 is provided between CPU 38, cache control module 42 and frequency control module 44. Additionally, address and control information path are provided between cache control module 42 and SRAM 40.

SRAM 40 provides a cache function by storing in short term memory information from either system memories 24 or 26 or from expansion memory which is located on an I/O device 28. Cache control module 42 incorporates random access memory (RAM) 56 which stores address locations of memories 24 and 26. CPU 38 may access information cached in SRAM 40 directly over the local bus 20. Frequency control module 44 synchronizes operation of the 50 Mhz processor portion 16 with the 40 MhZ base portion 18 and also controls the operation of buffers 46 and 48. Accordingly, frequency control module 44 determines the times at which information is captured by buffers 46 and 48 or the times at which information that is stored in these buffers is overwritten. Buffers 46 and 48 are configured to allow two writes from memories 24 and 26 to be stored simultaneously therein. Buffers 46 and 48 are bi-directional, i.e., they are capable of latching information which is provided by the CPU 38 and information which is provided to the CPU. Because buffers 46 and 48 are bi-directional, processor portion 16 of the processor complex 14 may be replaced or upgraded while maintaining a standard base portion 18.

Base portion 18 includes memory controller 58, direct memory access (DMA) controller 60, central arbitration control point (CACP) circuit 62, bus interface unit 64 and buffer/error correction code (ECC) circuit 66. Base portion 18 also includes driver circuit 68, read only memory (ROM) 70, self test circuit 72 and buffer 74. System bus 76 comprises a data information path 78, an address information path 80 and a control information path 82. The data information path connects buffer 74 with bus interface unit 64; bus interface unit 64 with DMA controller 60 and buffer/ECC circuit 66; and buffer/ECC circuit 66 with system memories 24 and 26. The address information path and the control information path each connect memory controller 58 with DMA controller 60 and bus interface unit 64; and bus interface unit 64 with buffer 74.

Memory controller 58 is coupled to both CPU local bus 20 and system bus 76, and provides the CPU 38, the DMA controller 60 or bus interface unit 64 (on behalf of an I/O device 28) with access to system memories 24 and 26 via memory bus 30. The memory controller 58 initiates system memory cycles to system memories 24 and 26 over the memory bus 30. During a system memory cycle, either the CPU 38, the DMA controller 60 or bus interface unit 64 (on behalf of an I/O device 28) has access to system memories 24 and 26 via memory controller 58. The CPU 38 communicates to system memory via local bus 20, memory controller 58 and memory bus 30, while the DMA controller 60 or bus interface unit 64 (on behalf of an I/O device 28) access system memory via system bus 76, memory controller 58 and memory bus 30.

For read or write cycles between CPU 38 and I/O bus 32, address information is checked against system memory address boundaries. If the address information corresponds to an I/O expansion memory address or I/O port address, then memory controller 58 initiates an I/O memory cycle or I/O port cycle with an I/O device 28 (via bus interface unit 64) over the I/O bus 32. During an I/O memory cycle or I/O port cycle between CPU 38 and I/O bus 32 the address which is provided to memory controller 58 is transmitted from system bus 76 to I/O bus 32 via bus interface unit 64 which resides intermediate these two buses. The I/O device 28 which includes the expansion memory to which the address corresponds receives the memory address from I/O bus 32. DMA controller 60 and the bus interface unit 64 control the interchange of information between system memories 24 and 26 and the expansion memory which is incorporated into an I/O device 28. DMA controller 60 also provides three functions on behalf of processor complex 14. First, the DMA controller 60 utilizes a small computer subsystem control block (SCB) architecture to configure DMA channels, thus avoiding the necessity of using programmed I/O to configure the DMA channels. Second, DMA controller provides a buffering function to optimize transfers between slow memory expansion devices and the typically faster system memory. Third, DMA controller 60 provides an eight channel, 32-bit, direct system memory access function. When providing the direct system memory access function, DMA controller 60 may function in either of two modes. In a first mode, DMA controller 60 functions in a programmed I/O mode in which the DMA controller is functionally a slave to the CPU 38. In a second mode, DMA controller 60 itself functions as a system bus master, in which DMA controller 60 arbitrates for and controls I/O bus 32. During this second mode, DMA controller 60 uses a first in, first out (FIFO) register circuit.

CACP circuit 62 functions as the arbiter for the DMA controller, I/O device bus controllers and the CPU (if accessing I/O devices). CACP circuit 62 receives arbitration control signals from DMA controller 60, memory controller 58 as well as from I/O devices, and determines which devices may control the I/O bus 32 and the length of time during which the particular device will retain control of the I/O bus.

Driver circuit 68 provides control information and address information from memory controller 58 to system memories 24 and 26. Driver circuit 68 drives this information based upon the number of single in-line memory modules (SIMMs) which are used to construct system memories 24 and 26. Thus, driver circuit 68 varies the signal intensity of the control and address information which is provided to system memories 24 and 26 based upon the size of these memories.

Buffer circuit 74 provides amplification and isolation between processor complex base portion 18 and system board 12. Buffer circuit 74 utilizes buffers which permit the capture of boundary information between I/O bus 32 and bus interface unit 64 in real time. Accordingly, if computer system 10 experiences a failure condition, buffer circuit 74 may be accessed by a computer repair person to determine the information which was present at connector 34 upon failure of the system.

ROM 70 configures the system 10 upon power-up by initially placing in system memory data from expansion memory. Self test circuit 72, which is connected to a plurality of locations within base portion 18, provides a plurality of self test features. Self test circuit 72 tests the major components of base portion 18 upon power-up of the system 10 to determine whether the system is ready for operation.

Figure 2B:
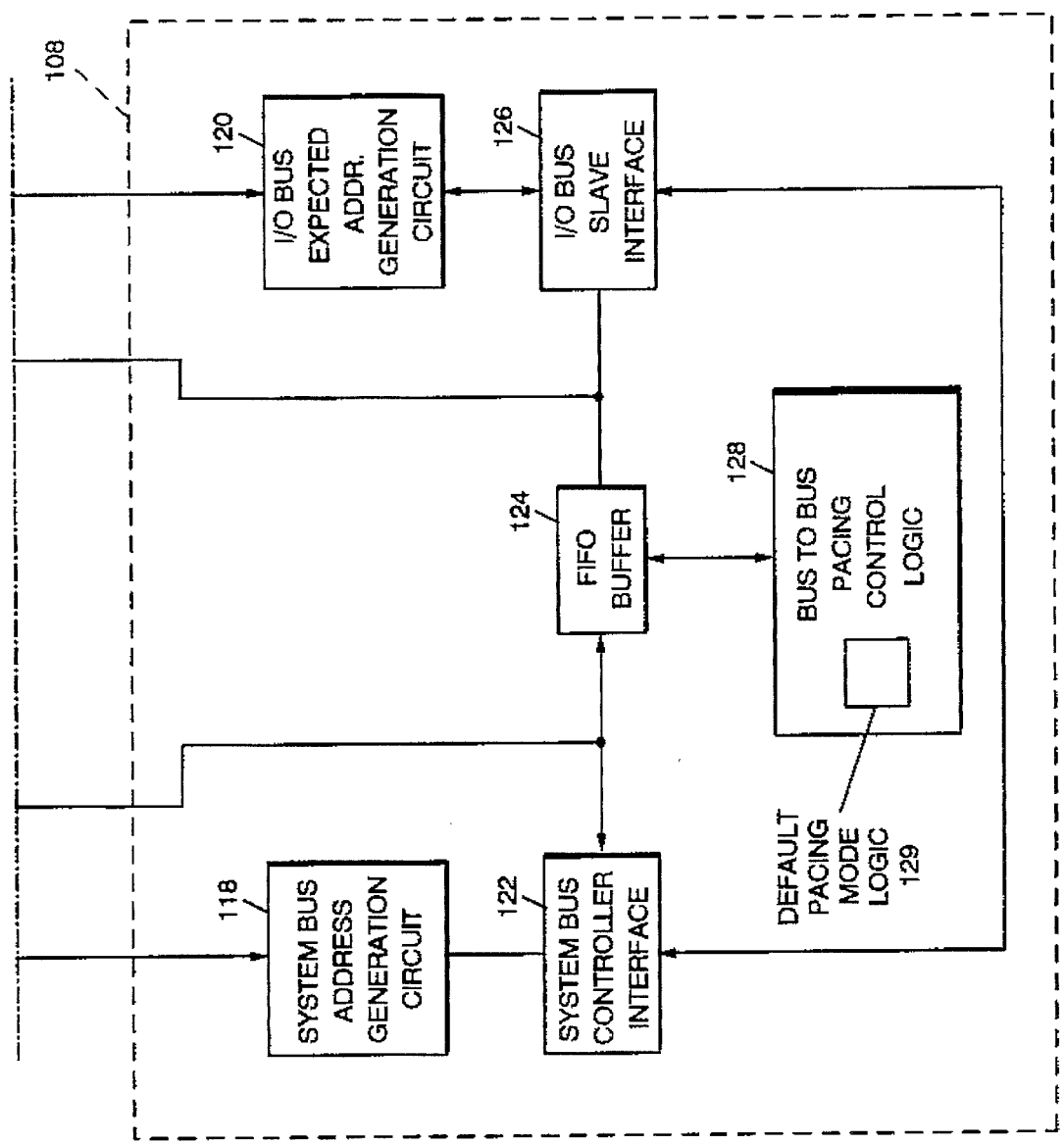
FIG. 2 is a schematic block diagram of the bus interface unit of the computer system of FIG. 1.

Referring to FIG. 2, a schematic block diagram of the bus interface unit 64 of the system of FIG. 1 is shown. Bus interface unit 64 provides the basis for implementation of the present invention by providing a bi-directional high speed interface between system bus 76 and I/O bus 32.

Bus interface unit 64 includes system bus driver/receiver circuit 102, I/O bus driver/receiver circuit 104 and control logic circuits electrically connected therebetween. Driver/receiver circuit 102 includes steering logic which directs signals received from the system bus 76 to the appropriate bus interface unit control logic circuits and receives signals from the bus interface unit control logic circuits and directs the signals to the system bus 76. I/O bus driver/receiver circuit 104 includes steering logic which directs signals received from the I/O bus 32 to the appropriate bus interface unit control logic circuits and receives signals from the bus interface unit control logic circuits and directs the signals to the I/O bus 32.

The bus interface unit control logic circuits include system bus to I/O bus translation logic 106, I/O bus to system bus translation logic 108, memory address compare logic 110, error recovery support logic 112, and cache snooping logic 114. Programmed I/O circuit 116 is also electrically coupled to system driver/receiver circuit 102.

The system bus to I/O bus translation logic 106 provides the means required for the DMA controller 60 or the memory controller 58 (on behalf of CPU 38) to act as a system bus controller to access the I/O bus 32 and thereby communicate with I/O devices 28 acting as slave devices on the I/O bus. Translation logic 106 translates the control, address and data lines of the system bus 76 into similar lines on the I/O bus 32. Most control signals and all address signals flow from the system bus 76 to the I/O bus 32 while data information flow is bi-directional. The translation logic 106 which acts as system bus slave monitors the system bus 76 and detects cycles which are intended for the I/O bus 32. Upon detection of such a cycle, the system bus slave translates the timing of signals on the system bus to I/O bus timing, initiates the cycle on the I/O bus 32, waits for the cycle to be completed, and terminates the cycle on the system bus 76.

The I/O bus to system bus translation logic 108 comprises system bus address generation circuit 118, I/O bus expected address generation circuit 120, system bus controller interface 122, FIFO buffer 124, I/O bus slave interface 126 and bus to bus pacing control logic 128. System bus controller interface 122 supports a high performance 32 bit (4 byte) i486 burst protocol operating at 40 MHZ. Data transfers of four, eight and sixteen bytes in burst mode and one to four bytes in no-burst mode are provided. I/O bus slave interface 126 monitors the I/O bus 32 for operations destined for slave devices on the system bus 76 and ignores those operations destined for the I/O bus 32. All cycles picked up by the I/O bus slave interface 126 are passed on to the FIFO buffer 124 and the system bus controller interface 122.

The I/O bus to system bus translation logic 108 provides the means required for an I/O device 28 to act as an I/O bus controller to access system bus 76 and thereby read or write to system memories 24 and 26. In either of these operations, an I/O device controls the I/O bus. The asynchronous I/O bus interface 126, operating at the speed of the I/O device, permits the bus interface unit 64 to act as a slave to the I/O device controller on the I/O bus 32 to decode the memory address and determine that the read or write cycle is destined for system memories 24 or 26. Simultaneously, the system bus controller interface 122 permits the bus interface unit 64 to act as a controller on the system bus 76. The memory controller 58 (FIG. 1) acts as a slave to the bus interface unit 64, and either provides the bus interface unit 64 with data read from system memory or writes data to system memory. The reads and writes to system memory are accomplished through the FIFO buffer 124, a block diagram of which is illustrated in FIG. 3.

Figure 3:
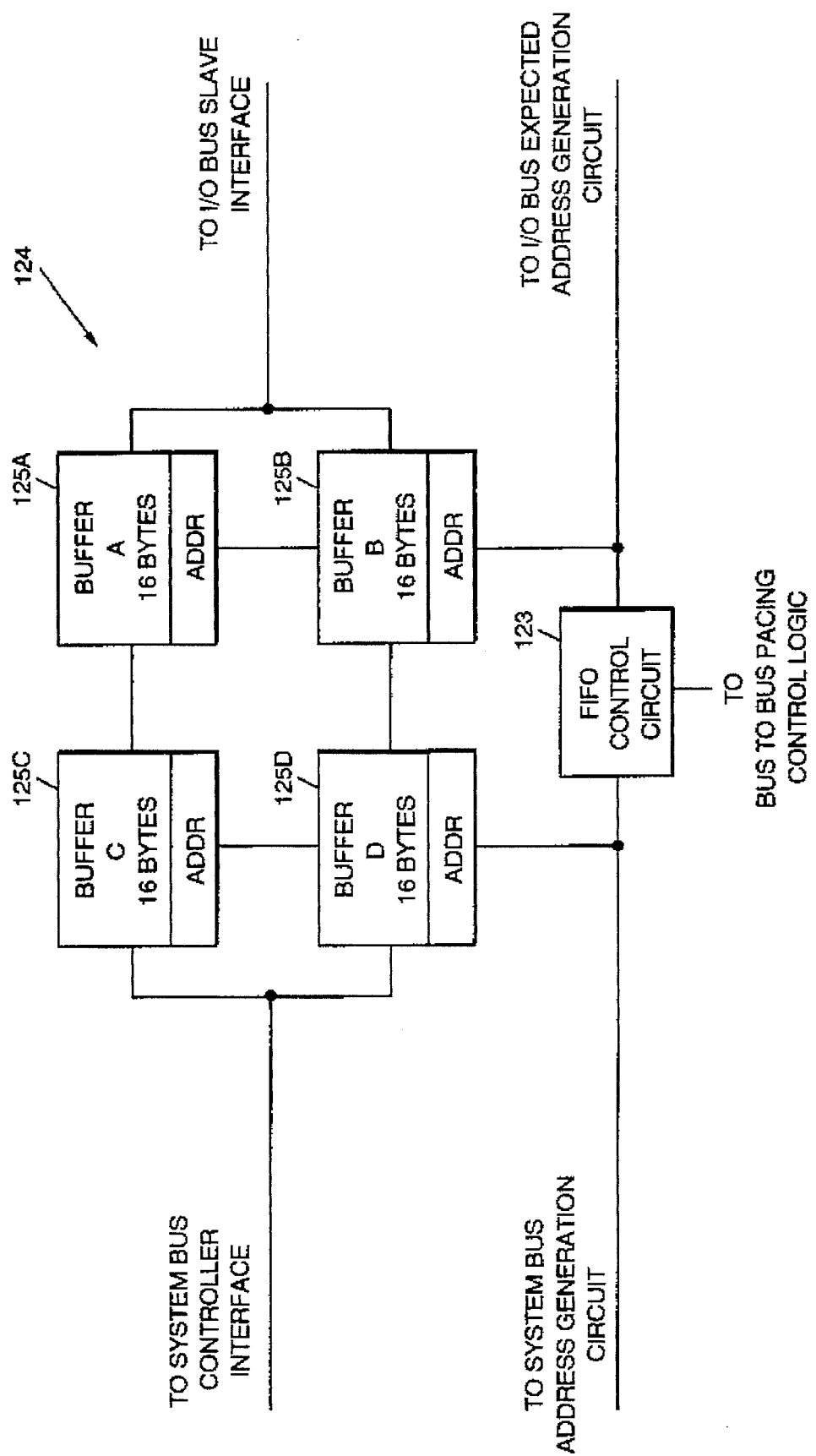
FIG. 3 is a schematic block diagram of the FIFO buffer of the bus interface unit of FIG. 2.

As shown in FIG. 3, FIFO buffer 124 is a dual ported, asynchronous, bi-directional storage unit which provides temporary storage of data information between the system and I/O buses 76, 32. FIFO buffer 124 comprises four sixteen-byte buffers 125A–125D and FIFO control circuit 123. The four buffers 125A–125D buffer data to and from I/O bus controllers and system bus slaves, thereby allowing simultaneous operation of the I/O bus 32 and the system bus 76. The FIFO buffer 124 is physically organized as two thirty-two byte buffers (125A/125B and 125C/125D). The system bus controller interface 122 and the I/O bus slave interface 126 each control one thirty-two byte buffer while the other thirty-two byte buffer operates transparently. Both of the thirty-two byte buffers are utilized for read and write operations.

Each FIFO 124A, 125B, 125C, 125D has an address register section either physically associated with the respective FIFO, or logically associated therewith. As data is transferred from the I/O bus 32 to FIFO 125A, the data will be accumulated until the 16 byte buffer is filled with 16 bytes of data, provided that the addresses are contiguous. If a non-contiguous address is detected, the FIFO 125A will transfer the stored data to FIFO 125C, and at the same time FIFO 125B will start to receive data from the new non-contiguous address. FIFO 125B will continue just as FIFO 125A did until it is filled with 16 bytes of data, or another non-contiguous address is detected. FIFO 125B will then transfer the stored data to FIFO 125D, and FIFO 125A again starts to store data; thus, it is possible to store up to four 16 byte blocks of noncontiguous address data.

Further, by having two 32 byte buffers in parallel the reading and writing of data can be toggled between them thus giving an essentially continuous read or write function.

Moreover, by splitting the 32 byte buffers into two 16 bytes buffer sections which are coupled to either I/O bus 32 or system bus 26, the number of storage buffers can be increased with minimal impact on the performance of the FIFO as related to the capacitive loading on signals clocking data in or out of the storage registers. This is accomplished because for every two buffers added (in parallel) only half the capacitive loading is added to the loading of clock signals on each bus.

Additionally, by having two 16 byte buffers in series, once one of the 16 byte buffers is filled with data, such as in a read operation, the data can be transferred to the other 16 byte buffers in series therewith, while the other two parallel buffers accumulate data. Hence, there is no time lost in either accumulating data, or transferring the data from one bus to the other.

The logic for controlling the operation of the FIFO 124 is supplied by FIFO Control Circuit 123.

A particular I/O device 28 may write to system memories 24 or 26 via I/O bus in bandwidths of either 1, 2 or 4 bytes (i.e., 8, 16 or 32 bits). During writes to system memory by an I/O device 28, the first transfer of write data is initially stored in the FIFO buffer 125A or 125B. The I/O bus expected address generation circuit 120 calculates the next expected, or contiguous, address. The next contiguous address is checked against the subsequent I/O address to verify if the subsequent transfers are contiguous or not. If contiguous, the second byte or bytes of write data is sent to the same FIFO buffer 125A or 125B. The FIFO receives data at asynchronous speeds of up to 40 megabytes per second from the I/O bus 32.

This process continues until either buffer 125A or 125B is full with a 16-byte packet of information or a non-contiguous address is detected. On the next clock cycle, assuming that buffer 125A is full, the data in buffer 125A is transferred to buffer 125C. Similarly, when buffer 125B is full, all of its contents are transferred to buffer 125D in a single clock cycle. The data stored in the buffers 125C and 125D is then written to system memory via an i486 burst transfer at the system bus operational speed. The operation of FIFO buffer 124 during a write to system memory by an I/O device is thus continuous, alternating between buffers 125A and 125B, with each emptying into adjacent buffer 125C or 125D, respectively, while the other is receiving data to be written to system memory. The FIFO buffer 124, then, optimizes the speed of data writes to system memory by (i) anticipating the address of the next likely byte of data to be written into memory and (ii) accommodating the maximum speed of write data from the FIFO buffer to system memory via the system bus 76.

During reads of data from system memory to an I/O device 28, FIFO buffer 124 operates differently. The system bus address generation circuit 118 uses the initial read address to generate subsequent read addresses of read data and accumulate data in buffer 125C or 125D. Because the system bus supports transfers in bandwidths of 16 bytes wide, the system bus controller interface 122 may prefetch 16-byte packets of contiguous data and store it in buffers 125C or 125D without the I/O bus 32 actually providing subsequent addresses, thus reducing latency between transfers. When buffer 125C is full of prefetched data, it transfers its contents to buffer 125A in one clock cycle. Buffer 125D similarly empties into buffer 125B when full. The data in buffers 125A and 125B may then be read by a particular I/O device controller in bandwidths of 1, 2 or 4 bytes. In this way, system bus address generation circuit 118 functions as an increment counter until instructed by the I/O controller device to stop prefetching data.

Bus to bus pacing control logic 128 creates a faster access to system memory for high speed I/O devices. The bus to bus pacing control logic 128 overrides the normal memory controller arbitration scheme of system 10 by allowing an I/O device in control of the I/O bus 32 uninterrupted access to system memory during transfers of data by faster devices which require multiple cycles, rather than alternating access to the memory controller 58 between the I/O device and the CPU. Thus, even if a local device such as the CPU has a pending request for control of the memory bus during a multiple cycle transmission by an I/O device, the bus to bus pacing control logic 128 will grant the I/O device continued control of the memory bus.

The programmed I/O circuit 116 is the portion of the bus interface unit 64 which contains all of the registers which are programmable within the bus interface unit 64. The registers have bits associated therewith to determine whether a particular register is active or inactive. These registers define, inter alia, the system memory and expansion memory address ranges to which the bus interface unit 64 will respond, the expansion memory addresses which are either cacheable or noncacheable, the system memory or cache address ranges, and whether or not parity or error checking is supported by the bus interface unit. Accordingly, programmed I/O circuit 116 identifies for the bus interface unit 64 the environment in which it resides, and the options to which it is configured. The registers in programmed I/O circuit 116 cannot be programmed directly over the I/O bus 32. Hence, in order to program the system 10, the user must have access to an I/O device which may communicate over the system bus to the programmed I/O circuit 116 at the CPU level.

Memory address compare logic 110 determines if a memory address corresponds to system memory or corresponds to expansion memory which is located on I/O device 28 coupled to the I/O bus 32. Because the system memory as well as the expansion memory may be in non-contiguous blocks of addresses, memory address compare logic 110 includes a plurality of comparators which are loaded with boundary information from registers in the programmed I/O circuit 116 to indicate which boundaries correspond to which memory. After a particular memory address is compared with the boundary information by the memory address compare logic, the bus interface unit is prepared to react accordingly. For example, if an I/O device controlling the I/O bus 32 is reading or writing to expansion memory, the bus interface circuit need not pass that address to the memory controller 58, thereby saving time and memory bandwidth.

Error recovery support logic 112 permits the system 10 to continue operations even if a data parity error is detected. On any read or write access by an I/O device 28 to system memories 24 or 26, parity of the data is checked. Support logic 112 interacts with a register in the programmed I/O circuit 116 for capturing the address and the time of the detected parity error. The contents of this register may then be acted upon by appropriate system software. For example, the CPU 38 may be programmed for a high level interrupt to pull the address out of the register at any time a parity error is detected. The CPU may then decide, based on the system software instructions, whether to continue system operations or merely terminate operation of the identified source of the parity error.

Cache snooping logic 114 permits the bus interface unit 64 to monitor the I/O bus 32 for any writes to expansion memory by an I/O device taking place over the I/O bus 32. The snooping logic first determines if the write to expansion memory occurred in expansion memory which is cacheable in SRAM 40. If it is not cacheable expansion memory, there is no danger of corrupt data being cached. If, however, a comparison indicates that the write occurred in cacheable expansion memory (a "positive comparison"), a cache invalidation cycle is initiated over the system bus 76. The CPU is thus instructed to invalidate the corresponding address in SRAM 40. Cache snooping logic 114 provides means to store the address of a positive comparison so that snooping of the I/O bus may continue immediately after detection of the first positive comparison, thereby permitting continuous monitoring of the I/O bus 32.

The present invention relates generally to the bus interface unit 64 described above and more particularly to the bus to bus pacing control logic 128 of the bus interface unit. The pacing control logic 128 is used to improve the ability of the I/O bus 32 to move data in and out of system memories 24 and 26 by dynamically controlling access of an I/O device to system memory. System performance is improved by locking the access of an I/O device 28 in control of the I/O bus 32 to system memory under certain predetermined conditions.

The bus to bus pacing control logic 128, in conjunction with FIFO buffer 124, is used to optimally match the data transfer speed of I/O bus controllers to the data transfer capability of the system memory. If, for example, a high speed I/O controller can write to system memory faster than the system memory can accept the write data, the buffered write data will fill the FIFO buffers 125A–125B completely before the data can be written to system memory. If the same high speed I/O controller can also read data from system memory faster than system memory can provide the read data, prefetched data will not be available in the FIFO buffers 125C and 125D. In either case, the result is increased latency, and hence decreased performance, in data transfer as seen by the I/O bus 32.

Typically, an I/O device controller will initiate a read or write operation and provide a memory address over the I/O bus 32 to the bus interface unit 64. Circuit 110 of the bus interface unit compares this address to a range of addresses programmed in circuit 116 to determine if the operation is destined for expansion memory or system memory. If it is determined that the operation is destined for expansion memory, bus to bus pacing control logic 128 does nothing, as there is no need to prioritize access to system memory under this condition. If, however, it is determined that the read or write operation is destined for system memories 24 or 26, and the predetermined conditions are met, the pacing control logic 128 initiates a signal which grants an I/O device 28 in control of the I/O bus 32 continued priority access to system memory. This signal acts as an override to the arbitration grant signal output by the memory controller 58 during normal arbitration procedures.

The predetermined conditions under which an I/O device is granted priority access to system memory are as follows: (1) a read request (prefetch) by an I/O device controlling the I/O bus 32 is not aligned with a predefined 16-byte address boundary in system memory, (2) an I/O device controlling the I/O bus 32 immediately follows a write cycle with a read cycle, (3) an I/O device controlling the I/O bus 32 completes a data transfer cycle, (4) an I/O device controlling the I/O bus 32 is reading or writing data in streaming mode (40 megabytes per second), or (5) more than two of the four 16-byte buffers in FIFO buffer 124 are already filled with data to be written to system memory or less than two of the four 16-byte buffers are yet to be filled with prefetched data to be read from system memory.

In the preferred embodiment of the present invention, the bus to bus pacing control logic 128 operates under three pacing modes. The first of these modes is the default mode, which determines pacing of bus control for the first three conditions listed above. The second of these modes (option 1) determines pacing for the fourth listed condition, and the third of these modes (option 2) determines pacing for the fifth listed condition. A user of the system may choose either pacing mode (option 1 or option 2) in addition to the default pacing mode which the system automatically provides. The choice is made by programming the contents of a 3-bit register 130 (not shown) in programmed I/O circuit 116. The default pacing mode is defined by a 0-0-0 register content; option 1 is defined by a 0-0-1 register content; and option 2 is defined by a 1-0-0 register content.

As explained above, the default pacing mode handles pacing for the first three pacing conditions. Under the first condition, an I/O device 28 requests a read of system memories 24 or 26 which is not aligned with a particular 16-byte packet boundary, meaning that the read request is for data addresses which begin somewhere within the boundaries of a 16-byte packet. If the read data were aligned with the boundaries of a particular 16-byte packet, the system bus address generation circuit 118 would simply do a standard 16-byte burst transfer of the data into either buffer 125C or 125D. However, if the read data is not packet aligned, the data must be prefetched using multiple 1, 2, 3 or 4 byte cycles. To insure that this data is prefetched in the most efficient manner, access by the I/O device 28 to system memory is locked while enough data is automatically prefetched to arrive at a 16-byte boundary. This read data of less than 16-bytes is then synchronized to the timing of the I/O bus 32, and the I/O device controller begins to read the data. In parallel with the I/O device controller reading data, the system bus address generation circuit 118 will prefetch the next contiguous 16-byte packet before releasing the lock signal to system memory. Because this 16-byte packet begins at a predefined boundary, a burst transfer is possible. Thus, two transfers of data are performed without interruption. Use of the lock signal 140 in this condition insures the least amount of latency between when a device on I/O bus 32 requests data and when bus interface unit 64 provides data, and the most efficient use of page mode system memory.

Under the second condition, residual buffered write data may exist in FIFO buffers 125A–125D when the I/O device 28 changes from a write transfer to a read request. Once the I/O device bus controller changes from a write to a read, pacing control logic 128 determines that an end of cycle has occurred, that there is no more write data to be stored in the FIFO buffer 124, and that read data is now being requested from system memories 24 or 26. Because it is known that no more contiguous write data is immediately forthcoming, the buffered data in buffers 125A–125D is written to system memory and the read request is prefetched from system memory in one atomic operation.

Under the third condition, residual buffered data may also exist in FIFO buffers 125A–125D when the I/O controller device relinquishes control of the I/O bus 32. In this instance, such residual data must be written to system memory before releasing the system bus 76. If more than one of the FIFO buffers 125A–125D include such residual data, as soon as the I/O device controller relinquishes control of the I/O bus 32, the pacing logic 128 will generate a signal to the memory controller to indicate that data in FIFO buffer 124 exceeds one transfer in length (i.e., greater than 16 bytes) and needs to be written to system memories 24 or 26. Use of the lock signal 140 in this condition insures the least amount of latency between the I/O controller releasing control of the I/O bus 32 and the bus interface unit 64 releasing control of system bus 76.

Figure 4:
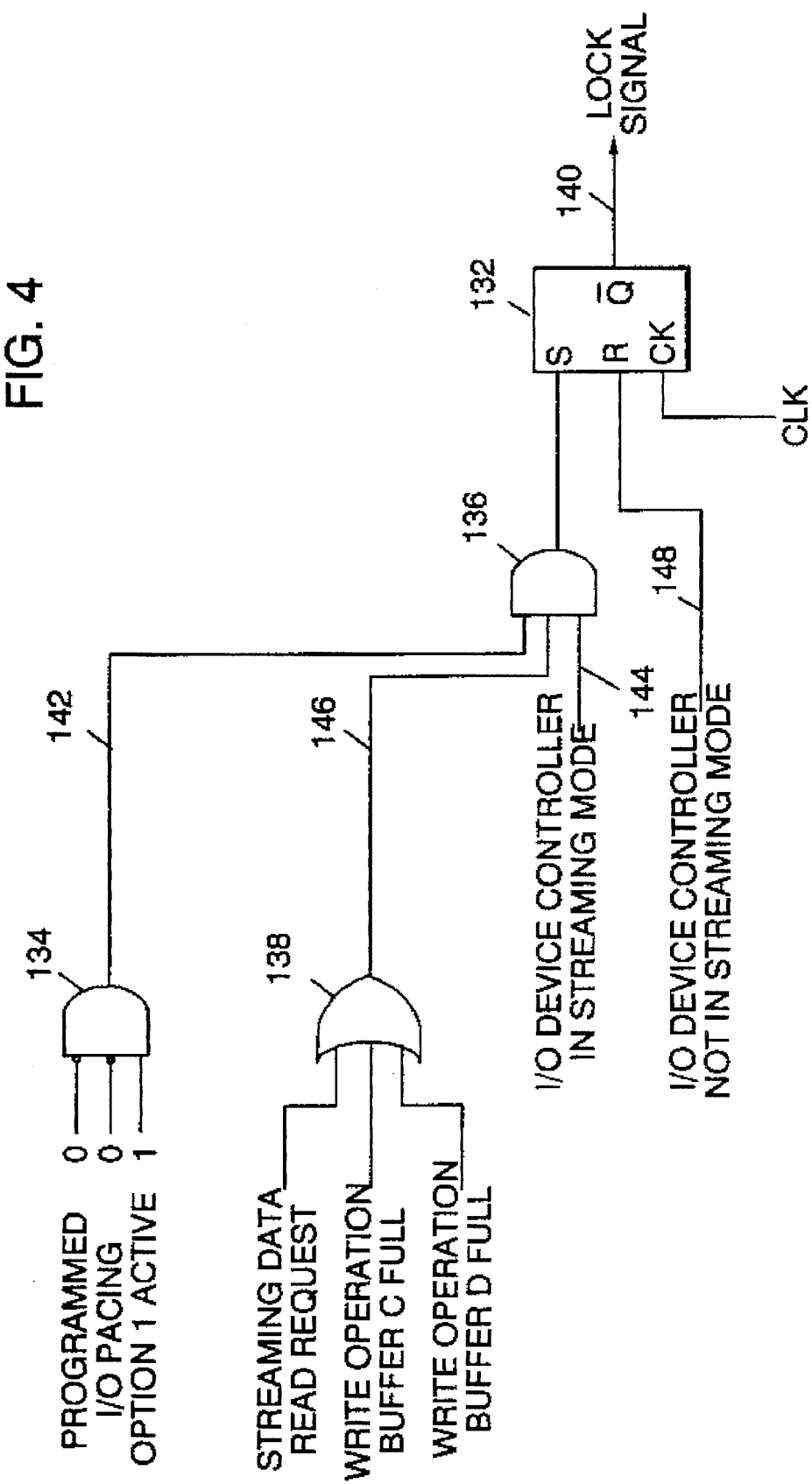
FIG. 4 is circuit diagram of the control logic used to implement one of the embodiments of the bus to bus pacing logic of FIG. 3.

The default logic used under the first three conditions is implemented by algorithms which are built into the hardware of the bus interface unit 64 as default pacing mode logic 129. Typically, state machines may be used to implement the required logic, as is known in the art. The pacing logic which responds to the fourth and fifth listed conditions is also realized by algorithms which are built into the bus interface unit hardware. FIGS. 4 and 5 illustrate circuit diagrams used to implement particular embodiments of the bus to bus pacing control logic 128 for option 1 and option 2, respectively.

Referring to FIG. 4, the bus to bus pacing control logic for implementing option 1 (relating to the fourth condition described above) comprises a clocked S-R latch 132, AND gates 134 and 136, and OR gate 138. At any time the latch 132 is set (S-input active), the latch outputs a LOCK signal 140. The LOCK signal 140 provides an I/O device 28 in control of the I/O bus 32 continued access to system memory when the I/O device 28 is reading or writing data to system memories 24 and 26 in streaming mode. Streaming refers to data transfers of a stream of data having contiguous addresses wherein only the first address needs to be decoded and the subsequent addresses are considered to be contiguous.

Upon detection of a streaming data write operation by the logic of FIG. 4 with either of FIFO buffers 125C or 125D being full with a 16-byte packet of buffered write data, the lock signal is activated and a burst write sequence is initiated to system memory over the system bus 76 and will remain active until the I/O device 28 terminates the streaming sequence or until there is no data remaining in the FIFO buffers. Similarly, upon detection of a streaming data read operation, the lock signal is activated and a burst read sequence is initiated to system memory and will remain active as long as FIFO capacity permits or until the I/O device 28 terminates the streaming sequence. Bus control logic 128 is responsive to streaming reads or writes as defined by programming a 0-0-1 register content in the 3-bit register 130 (not shown in the drawings). Hence, if the 3-bit register is programmed to 0-0-1, AND gate 134 will decode the content of the register and provide a HIGH option 1 enable line 142. Line 144 will also be HIGH as long as the bus interface unit 64 detects that the particular I/O device 28 in control of the I/O bus 32 is writing or reading data in streaming mode. Because lines 142 and 144 are HIGH during this time, AND gate 136 will set the latch 132 to output LOCK signal 140 any time output 146 of OR gate 138 is HIGH.

Output 146 of OR gate 138 is HIGH when either (i) the I/O device 28 in control of the I/O bus 32 issues a streaming data read request (read operations) or (ii) either of 16-byte buffers 125C or 125D in FIFO 124 is full (write operations). In either of these instances, and with lines 142 and 144 HIGH as explained above, the latch 132 will override the arbitration scheme of memory controller 58 by providing the memory controller with a LOCK signal 140. Whenever the I/O device 28 indicates that it is no longer transmitting read or write data in streaming mode, line 148 goes HIGH, thereby resetting the latch 132 and effectively disabling the logic of FIG. 4.

Referring to FIG. 5, the bus to bus pacing control logic for implementing option 2 (relating to the fifth condition described above) comprises clocked S-R latches 150 and 152, each of which is controlled independently by for read and write cycles. At any time either of these clocked latches 150, 152 are set, LOCK signal 140 is enabled and output to the memory controller 58. The latches are reset by activating the R-input, thereby disabling the latches from outputting the LOCK signal.

Under the fifth condition listed above, either (i) data is being written by an I/O controller 28 over I/O bus 32 to bus interface unit 64 faster than it can be written over system bus 76 to system memory, or (ii) data is being read from the bus interface unit 64 by the I/O controller 28 faster than bus interface unit can prefetch data from system memory. If data is being written too fast by an I/O controller, residual data begins building up in FIFO buffers 125A–125D. If more than half of the FIFO buffer space contains such residual data, a LOCK signal 140 is initiated by latch 152 to permit atomic transfers to system memory. If data is being read too quickly from bus interface unit 64 by I/O controller 28 over I/O bus 32, FIFO buffers 125A or 125B will empty, meaning that buffers 125C and 125D are depleted of available prefetched contiguous data. A LOCK signal 140 is thus output by latch 150 so that the bus interface unit may prefetch data into buffers 125C and 125D. Accordingly, at least half of the FIFO buffer 124 is maintained filled with prefetched data.

Bus control logic is responsive to the fifth condition as defined by programming a 1-0-0 register content in the 3-bit register 130 (not shown). Hence, if the 3-bit register is programmed to 1-0-0, NOR gate 154 will decode the content of the register and provide a HIGH option 2 enable line 156. The option 2 enable line 156 is used to enable the control logic for both data read operations (the upper half of logic of FIG. 5) and data write operations (the lower half of logic of FIG. 5).

During write operations, the output 158 of OR gate 160 will also be HIGH as long as at least two of the buffers 125A–125D are full. Typically, this means that either buffer 125A or 125B has been filled and has transferred data to buffer 125C or 125D, respectively, and the other of buffers 125A or 125B is now being filled. In this case, data is in either buffer 125C or 125D, or both, and can immediately be written to system memory. With lines 156 and 158 HIGH, AND gate 162 will set latch 152 which will then output the LOCK signal 140 to the memory controller 58. The LOCK signal 140 will remain active until the R-input of latch 152 is driven HIGH by the output of AND gate 164. The output of AND gate 164 goes HIGH if both buffers 125C and 125D are empty, thereby indicating that there is no need to immediately write data to system memory from these buffers.

During read operations, latch 150 will output the LOCK signal to memory controller 58 when the latch 150 is set by a HIGH output of AND gate 166. The output of AND gate 166 is driven high when (i) line 156 is HIGH due to option 2 being active, (ii) line 168 is HIGH due to the bus interface unit 64 detecting a read from system memory, and (iii) line 170 is driven LOW by NOR gate 172 when one of the buffers 125A or 125B is empty. A LOCK signal is initiated in this case because, with either buffer 125A or 125B empty, the contents of buffers 125C or 125D may be emptied therein, leaving room in either buffer 125C or 125D for prefetched contiguous data from system memory.

The LOCK signal in read operations remains active until the R-input of latch 150 is activated by OR gate 174. The output of OR gate 174 is driven HIGH at any time (i) the bus interface unit 64 detects that there is no read from system memory or (ii) either of buffers 125C and 125D is full and neither of buffers 125A and 125B is empty (via AND gate 178, OR gate 176 and NOR gate 172). In either of these two cases, the LOCK signal is not necessary, and, accordingly, the latch 150 is reset. Access to system memories 24 and 26 is then controlled under the normal arbitration scheme implemented by the memory controller 58.

Accordingly, the preferred embodiment of a bus control logic system for computers having a dual bus architecture has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

We claim:

1. An information handling system, comprising:

a system memory;

a plurality of system resource devices;

a first bus coupled to the system memory and the system resource devices for transferring data among the system resource devices and the system memory;

a second bus coupled to the system resource devices, said system resource devices coupled to the second bus being capable of controlling the second bus by arbitrating for control with other of said system resource devices; and a bus interface unit coupled between the first bus and the second bus for providing data transfer capability therebetween, said bus interface unit including a buffer for temporarily storing data to be transferred between the first bus and the second bus, and control logic for generating a control signal after one of the system resource devices has gained control of the second bus in order to gain control of the first bus, thereby preventing other of said system resource devices from accessing the first bus, said control logic being dynamically responsive to signals indicative of data transfer conditions between the first bus and the second bus to generate said control signal.

2. The system of claim 1, wherein said bus interface unit further includes a programmable circuit in which those data transfer conditions that cause the control logic to dynamically generate said control signal are programmable.

3. The system of claim 1, wherein said control logic includes default pacing mode logic for determining whether a read request by said one of said system resource devices to said system memory does not align with a predefined sixteen byte address boundary of the system memory and for dynamically generating said control signal in response thereto.

4. The system of claim 1, wherein said control logic includes default pacing mode logic for determining whether said one of said system resource devices follows a write operation to said system memory with a read operation to said system memory and for dynamically generating said control signal in response thereto.

5. The system of claim 1, wherein said control logic includes default pacing mode logic for determining whether said one of said system resource devices has completed a data transfer operation and for dynamically generating said control signal in response thereto.

6. The system of claim 1, wherein said control logic includes pacing control logic for determining whether said one of the system resource devices is reading or writing to said system memory in a streaming mode and for dynamically generating said control signal in response thereto.

7. The system of claim 1, wherein said control logic includes pacing control logic for detecting a capacity of the buffer and for dynamically generating the control signal according to the detected capacity.

8. The system of claim 1, wherein said second bus comprises an input/output (I/O) bus and the system resource devices coupled to the second bus comprise I/O devices.

9. The system of claim 8, wherein said first bus supports burst transfers of read or write data between said bus interface unit and said system memory in bandwidths of up to sixteen bytes, and wherein said input/output bus supports transfers of read or write data between said input/output device and said bus interface unit in bandwidths of one, two and four bytes.

10. The system of claim 1, wherein said buffer comprises a dual ported, asynchronous, bi-directional storage unit.

11. The system of claim 10, wherein said storage unit includes at least two pairs of sixteen byte buffers, said at least two pairs of buffers being used for both read and write operations.

* * * * *